(12) United States Patent
Bratten et al.

(10) Patent No.: US 10,456,726 B2
(45) Date of Patent: Oct. 29, 2019

(54) DEMISTER APPARATUS AND METHOD (71) Applicants: Keith Bratten, White Lake, MI (US); Scott Bratten, Farmington Hill, MI (US)

(72) Inventors: Keith Bratten, White Lake, MI (US); Scott Bratten, Farmington Hill, MI (US)

(*) Notice: Subject to any disclaimer, the term of this patent is extended or adjusted under 35 U.S.C. 154(b) by 269 days.

(21) Appl. No.: 15/450,280

(22) Filed: Mar. 6, 2017

(65) Prior Publication Data

US 2017/0239606 A1 Aug. 24, 2017

Related U.S. Application Data (62) Division of application No. 14/320,864, filed on Jul. 1, 2014, now abandoned.

(Continued)

(51) Int. Cl.
*B01D 45/00* (2006.01)
*B01D 46/44* (2006.01)
(Continued)

(52) U.S. Cl.
CPC .......... *B01D 46/446* (2013.01); *B01D 45/06* (2013.01); *B01D 45/08* (2013.01); *B01D 45/12* (2013.01); *B01D 45/16* (2013.01); *B01D 46/003* (2013.01); *B01D 50/002* (2013.01); *B01D 46/0002* (2013.01); *B01D 46/0086* (2013.01); *B01D 2273/30* (2013.01); *B04C 3/00* (2013.01); *B04C 3/06* (2013.01)

(58) Field of Classification Search
CPC .... B01D 45/12; B01D 46/003; B01D 50/002; B01D 2273/30; B01D 45/08; B01D 45/16; B01D 45/06; B01D 46/0086; B01D 46/0002; B04C 3/00; B04C 3/06; Y10S 55/18; Y10S 55/46; Y10S 55/36; F24C 15/2035
See application file for complete search history.

(56) References Cited

U.S. PATENT DOCUMENTS 2,788,954 A * 4/1957 Paasche ................ B05B 14/465
261/5
3,170,384 A * 2/1965 Krantz .................... B05B 16/00
454/54
(Continued)

FOREIGN PATENT DOCUMENTS

JP 05208164 A * 8/1993 ........... B01D 50/002

OTHER PUBLICATIONS

Let Cyclone 2000 Improve Your Plant Air Environment—TMI Industrial Air Systems—5 pages, 2002.

*Primary Examiner* — Dung H Bui
(74) *Attorney, Agent, or Firm* — John R. Benefiel (57) ABSTRACT

A demister apparatus for machine tools having an enclosure booth for confining mist in which a varying outflow of air is drawn from the booth and directed to a remote demister apparatus from a minimum when the access doors to the enclosure are closed to a maximum when one or more of the doors are opened. The air flow may also be varied with the number of machine tools in operation as well with the state of filters in the remote demister apparatus. A cyclonic separator is also provided adjacent to the booth which functions well in a vertical up flow mode over a range of air outflow rates of flow.

5 Claims, 5 Drawing Sheets

Related U.S. Application Data (60) Provisional application No. 61/913,553, filed on Dec. 9, 2013.

(51) Int. Cl.

| | | |
|---|---|---|
| *B01D 45/06* | (2006.01) | |
| *B01D 45/08* | (2006.01) | |
| *B01D 45/12* | (2006.01) | |
| *B01D 46/00* | (2006.01) | |
| *B01D 50/00* | (2006.01) | |
| *B01D 45/16* | (2006.01) | |
| *B04C 3/00* | (2006.01) | |
| *B04C 3/06* | (2006.01) | |

(56) References Cited

U.S. PATENT DOCUMENTS

| | | | | |
|---|---|---|---|---|
| 3,807,291 | A * | 4/1974 | Roberts | B08B 15/00 454/55 |
| 3,932,151 | A * | 1/1976 | Lau | B01D 45/08 96/325 |
| 4,303,417 | A * | 12/1981 | Koch, II | B01D 46/10 95/268 |
| 4,472,181 | A * | 9/1984 | Herrlander | B01D 53/14 96/235 |
| 4,504,292 | A * | 3/1985 | Vohringer | B05B 14/45 55/325 |
| 4,537,120 | A * | 8/1985 | Josefsson | B05B 16/95 454/52 |
| 4,608,064 | A * | 8/1986 | Napadow | B01D 50/004 96/307 |
| 4,616,594 | A * | 10/1986 | Itho | B05B 16/95 118/326 |
| 4,664,061 | A * | 5/1987 | Morioka | B05B 16/20 118/663 |
| 4,687,686 | A * | 8/1987 | Stofleth | B05B 16/60 427/421.1 |
| 5,090,136 | A * | 2/1992 | Hunt | B05B 16/60 34/218 |
| 5,113,600 | A * | 5/1992 | Telchuk | F26B 21/04 34/90 |
| 5,127,574 | A * | 7/1992 | Mosser | B05B 16/60 236/44 R |
| 5,213,259 | A * | 5/1993 | Stouffer | B05B 16/60 236/44 C |
| 5,743,958 | A * | 4/1998 | Shutic | B05B 7/1404 118/308 |
| 5,788,728 | A * | 8/1998 | Solis | B01D 45/12 55/422 |
| 6,368,387 | B1 * | 4/2002 | Buquet | B04C 5/14 95/271 |
| 6,837,931 | B1 * | 1/2005 | McGough | B05B 16/95 118/326 |
| 7,311,744 | B2 | 12/2007 | Elliott | |
| 7,727,295 | B2 | 6/2010 | Fill et al. | |
| 8,266,945 | B2 | 9/2012 | Hartshorne | |
| 2007/0277672 | A1 * | 12/2007 | Johansson | B01D 46/0086 95/26 |

* cited by examiner

DEMISTER APPARATUS AND METHOD

CROSS REFERENCE TO RELATED APPLICATIONS

This application is a divisional of U.S. Ser. No. 14/320,864 filed on Jul. 1, 2014 which claims the benefit of U.S. provisional application Ser. No. 61/913,553 filed on Dec. 9, 2013.

BACKGROUND OF THE INVENTION

In automated machining of parts such as engine components, the machining takes place at machine stations, each station enclosed to form a booth. A coolant/lubricant liquid is sprayed onto the part during the machining operations in order to reduce friction and cool the part.

This spraying creates a fine mist which is intended to be confined within the booth in order to prevent the mist from being dispersed into the air within the plant, where it could be inhaled by plant personnel and present a health hazard. Also, the mist can condense onto adjacent surfaces, creating a maintenance burden.

Oil in the coolant/lubricant can also evaporate from the mist into the air and create an air pollution problem.

In order to minimize this effect, the conventional practice has been to constantly draw a large volume of air out of the booths and into ducting with a fan driven by a powerful electric motor drawing considerable power. This is intended to prevent the mist from dispersing into the air in the plant. The ducting leads to a central filter/demister where the mist is completely removed from the air before being discharged back into the atmosphere.

The coolant/lubricant condensed from the mist is collected and directed back to the machine station for reuse.

It has heretofor been recognized that it is advantageous to remove as much mist as possible at a location close to the machine tool station rather than transporting all of it to a central demisting location in order to reduce the quantity of mist transported through the ducting to the central unit. This is because leaking of condensed mist from the ducting, and evaporation of the oil in the mist into the air can both occur in the ducts, which effects will contribute to the air pollution problem mentioned above. In addition, condensed water can aid the growth of mold and creation of a fire hazard. Also, less mist flowing in the ducts reduces the maintenance efforts required in cleaning the ducting through which the mist flows.

Furthermore, high efficiency air filters (HEPA) are used to completely remove the residual mist, and these filters would rapidly become blocked if all of the mist were to reach those filters, greatly increasing maintenance costs since HEPA filters are very expensive.

A decentralized demister arrangement is described in U.S. Pat. Nos. 8,266,945 and 7,727,295, incorporated herein by reference, as well as in a TMI brochure published in 2002, referenced in those patents.

The volume of air flow drawn out of a CNC machine booth is conventionally set at a high flow rate which is thought necessary to prevent escape of oily mist from the machining booth at any time during the machine cycle, and also to insure proper operation of the cyclonic separator.

That is, the cyclonic separators typically used have usually required high air flow rates through them in order to be effective.

It is an object of the present invention to provide a demister arrangement for machine tool installations which greatly reduces the power consumption required while insuring that no mist escapes from the machining booth at any time.

SUMMARY OF THE INVENTION

The above recited object as well as other objects which will be understood by those skilled in the art upon a reading of the following specification and claims is achieved by reducing the rate of air flow drawn from the machining booth to that minimally necessary to insure that no mist escapes the machine tool booth. This is achieved by varying the volume of air flow drawn out from the booth to a low level which is all that will be needed during those periods when the access doors to the machining center booth enclosure are closed, to a maximum air flow drawn from the booth when the doors are opened, as when loading and removing parts being machined in the station.

The differing out flow rates are preferably achieved by using a variable frequency drive (VFD) control on a fan motor used to draw air from the booth, to significantly reduce the total power consumption of the fan motor by reducing the power to the fan motor from a level when full output is required to a reduced level of air flow out adequate to maintain a vacuum level in the booth. This will insure that no mist containing air escapes from the enclosure booth at any time during the machining operation.

It has been determined that a particular cyclonic separator of a type described in U.S. Pat. No. 7,311,744, incorporated herein by reference when operated in a "vertical up" mode has the capability of operating successfully to remove mist over the range of air outflow rates through the separator which is necessary to substantially minimize power consumption of the fan motor over the machine cycle.

A similar situation is presented in a multi-station installation, when the fan motor conventionally is set to always run to produce the air outflow rate necessary to prevent out flow of booth air, when all stations are operating. In the present invention, an automatic step down of the fan motor operation is carried out if fewer machining stations are on line, so that a significantly lower air out flow rate will suffice, to also conserve power.

Additionally, the fan motor may be controlled to vary in correspondence to the flow resistance encountered in the demister filters, i.e., the fan motor power can set at a minimal level when the filters are clean and increased as the HEPA and/or other filters at the central demister become more clogged.

DESCRIPTION OF THE DRAWINGS

FIG. 1 is a pictorial view of a machining booth with a connected demister/filter apparatus and a block diagram representation of associated controls therefore according to the present invention.

FIG. 1A is an enlarged sectional view of a typical duct joint showing a sealed connection.

FIG. 2 is a diagram of a second stage demister/filter with block diagram depiction of control sensor components.

FIGS. 3A, 3B and 3C are diagrams of alternative control schemes which could be utilized to vary the fan motor power.

FIG. 4 is a plot of efficiency versus air flow rate of the cyclonic separator used in the apparatus and method of the present invention.

FIG. 5 is a side view of the cyclonic separator as used in the invention.

FIG. 5A is a longitudinal cross section of the cyclonic separator shown in FIG. 5.

FIGS. 6 and 7 are downstream and upstream end views, respectively, taken along the lines 6-6 and 7-7 in FIG. 5.

FIG. 8 is a perspective view of the cyclonic mist separator shown in FIGS. 5-7, with portions of the cyclonic mist separator housing being cut-away for clarity to showing certain internal components.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
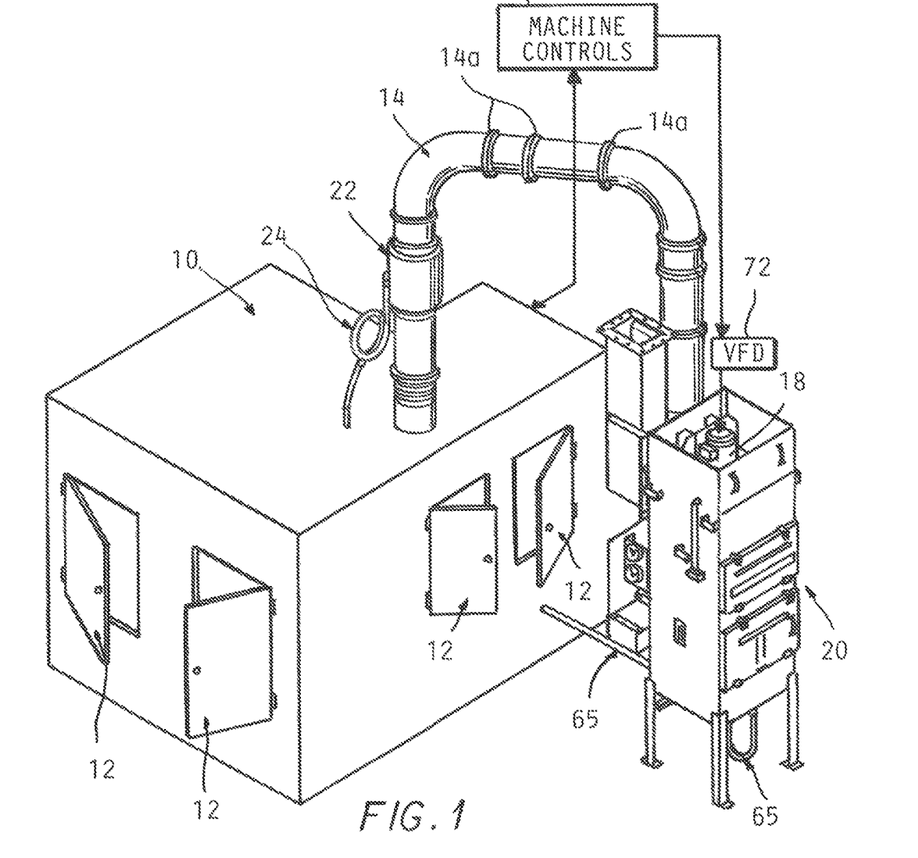
Figure 1A:
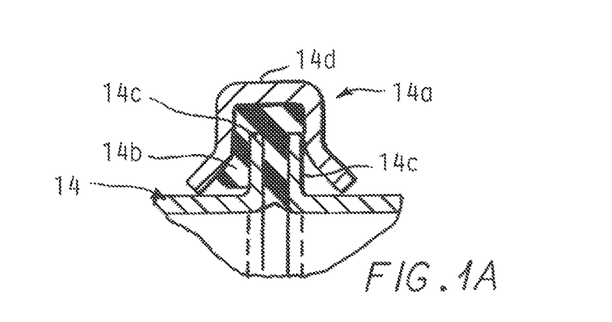

Referring to FIG. 1, a machining center booth 10 is shown which encloses a conventional automated CNC machining station (not shown) in which parts are machined with the use of metal cutting tools in the well known manner.

The parts are typically unloaded after one or more access door panels 12 are opened, as indicated in FIG. 1 by load/unload robots or other part handling devices (not shown), which then load parts to be machined into the machines, with the access door panels then closed.

As noted, such machining operations use metal cutting tools which involve the use of cutting fluids sprayed on the part and tools in the well known manner. This generates mist such as from oil, water vapor, synthetic coolant, etc. which is designed to be confined within the booth 10 in order to prevent the mist from escaping into the surrounding air where it would present the various problems referred to above.

Figure 2:
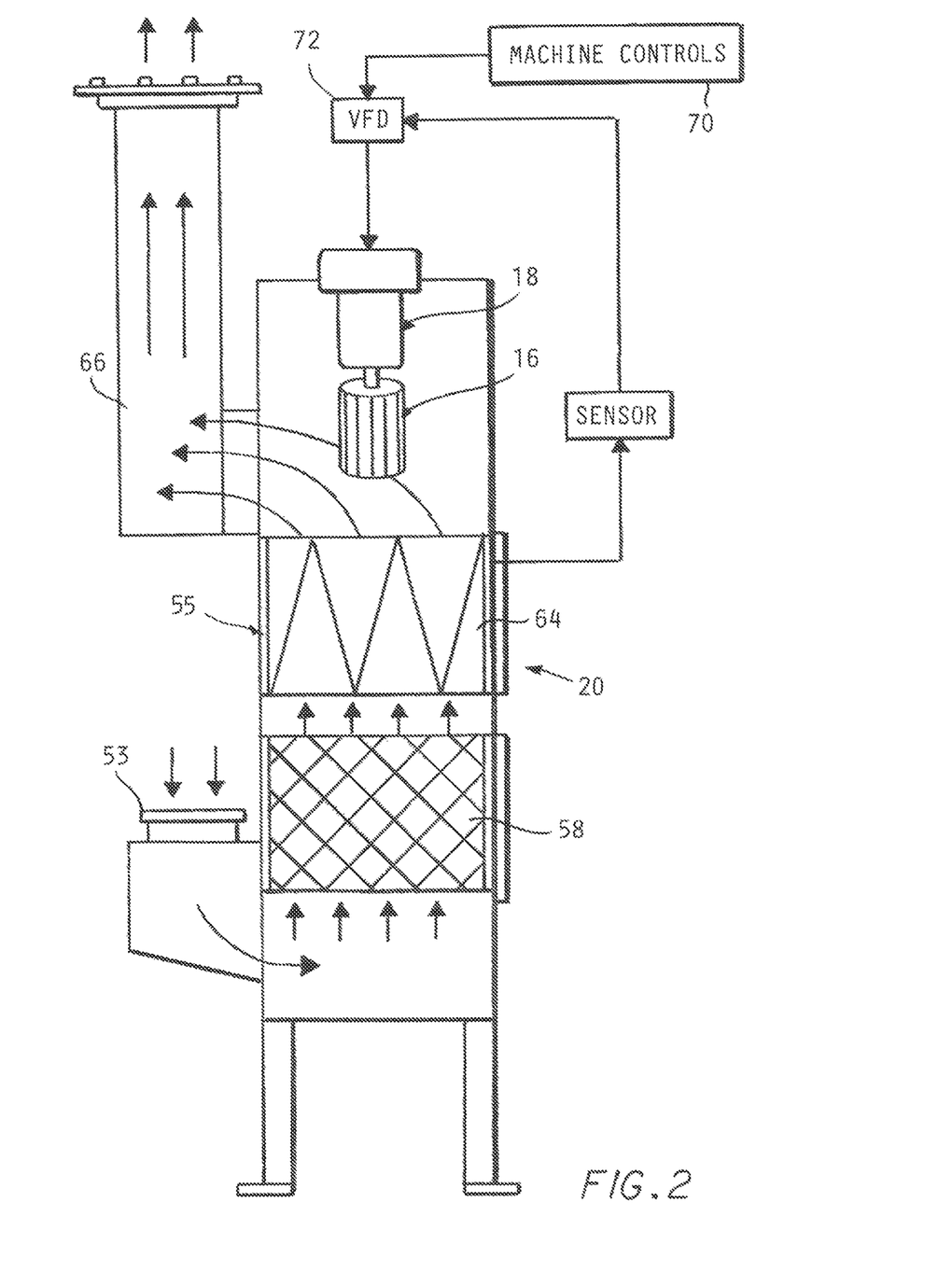

This is done conventionally by continuously drawing the air into which the mist has dispersed out from booth 10 and into ducting 14 by operation of a blower 16 which is driven by a powerful electric motor 18 (FIG. 2). The blower 16 may be contained within a central separator/filter apparatus 20.

Air flow is drawn into of the machining center booth 10 and is continuously maintained so as to make certain that none of the mist containing air escapes the confines of the machining center booth 10 except the flow of mist containing air drawn out through exhaust duct system 14 by the operation of the blower 16.

As described above, it is now known that it is desirable to remove as large proportion of the mist at points close to each booth 10, rather than directing the mist laden air to a central filter/demister before removing any of the mist, as was the former practice.

Again, this is because movement of the air containing the mist through long ducts increases the evaporation of oils into the atmosphere to create air pollution, and finally, partially condenses the mist therein, to create a fire hazard, and mold growth, creates a maintenance burden due to the necessity for regular cleaning of the ducts. This also necessitates pumping of condensed coolant back to the machining stations for reuse.

Thus, it is now common practice to install a first stage separator immediately above the enclosure 10, which collects condensed mist liquid that is drained back into the reservoir of cutting fluids in the machine tool in the booth 10, as by gravity via a drain line 24.

Referring to FIG. 2, the details of a central demister/filter apparatus 20 are shown with the blower motor 18 and blower 16 mounted within a housing 56 located above aluminum mesh washable prefilter 58; and 95% DOP HEPA filter 64. The HEPA top filter 64 insures substantially all of the mist is removed from the air flow prior to its discharge into the outlet 66 and thence into the atmosphere.

The air inlet 53 (connected to ducting 14), receives air flow at a point below the prefilter 58 and is drawn up by operation of the blower 16.

Condensed mist drawn from the prefilter 58 and final filter 64 is collected at the bottom of the housing 55 and drains back by gravity or is pumped back to the station via pipe 65 (FIG. 1).

The machine control 70 receives a signal from a sensor (not shown) detecting when the panels 12 are open or closed such that a variable frequency (VFD) 72 drive control is operated to normally run the blower motor 18 at a substantially reduced power setting which is still adequate to maintain vacuum levels existing within the booth 10 to present the escape of air, i.e., when the panels 12 are closed, and at a stepped up power level only when the access door panels 12 are opened.

There are several ways to determine when and to what extent the air flow drawn out of the booth 10 must be varied over the course of operation of the machining station to achieve the benefits of the present invention.

Firstly and preferably, the machine controls 70 transmits a signal to the VFD drive control 72 when the door panels 12 are about to be opened by the machine controls 70 for the unloading and loading of parts, such that the blower motor 18 power can be stepped up to a much higher level, predetermined to be adequate to reliably insure mist containing air will not escape from the booth 10 at this time.

This approach allows anticipation of the need for increased air flow so that the shift to a higher flow rate can be initiated before the access door panels 12 open and thus actually be developed by the time the door panels 12 are opened.

This requires integration with the machine controls 70 which may require the cooperation of those responsible for the machine tool operation.

Figure 3A:
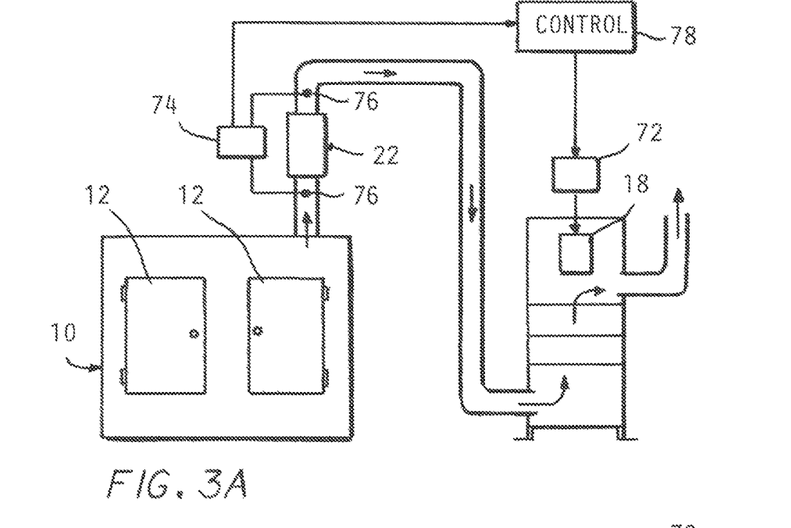

An alternative approach is depicted in the arrangement of FIG. 3A, in which changes in air flow are sensed such as by measuring the pressure drop across the first stage separator 22 with a differential pressure sensor 74 connected to pressure taps 76 on either end of the separator 22.

As the door panels 12 begin to open, the air flow and pressure drop will begin to increase due to the reduced restriction of the air flow entering the booth 10. In response, the power level of the blower motor 18 is correspondingly ramped up, set by a control 78 acting on the VFD 72.

Such differential pressure sensor 74 can be connected anywhere in the system to detect increases in the air flow drawn out of the machining center booth 10 into the exhaust duct system 14.

Figure 3B:
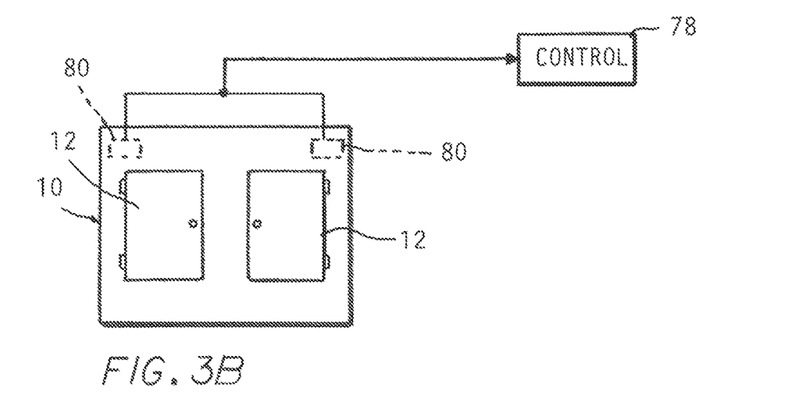

Another alternative approach is depicted in FIG. 3B, where one or more vacuum sensors 80, 82 are provided within the machining center booth 10 at one or more locations therein in order to sense vacuum level changes anywhere within the machining center booth 10.

As the access door panels 12 begin to open, the vacuum level within the enclosure booth 10 will begin to lessen, i.e., the pressure in the booth 10 will begin to increase, so that the vacuum level will begin to decline.

This reading will be sent to control 78 which acts on the VFD to cause a corresponding increase in power of the blower motor 18 as in FIG. 3A as necessary to maintain the vacuum level.

As the vacuum level starts to move higher as the door panels 12 begin to close, this is sensed by the sensors 80, 82 and the air flow rate reduced accordingly.

Figure 3C:
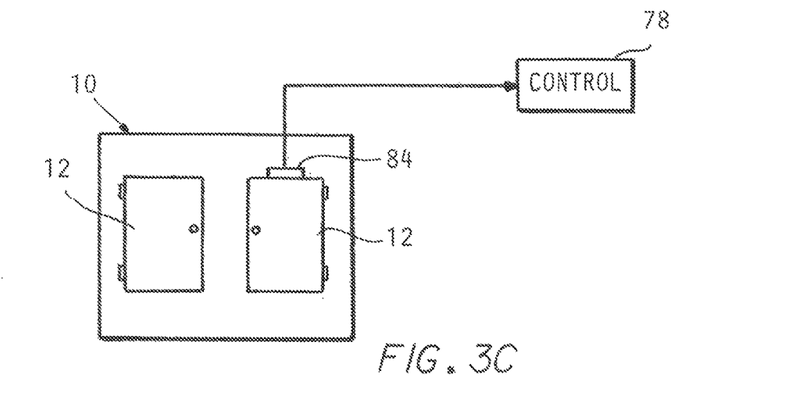

FIG. 3C shows yet another alternative approach in which a switch 84 is associated with one or more of the access door panels 12 which generate a signal when the associated access door panel 12 begins to open. Again, this causes the control 78 to generate a signal transmitted to the VFD 72 increasing the power to the blower motor 18 to induce an increase of the outflow of air from the booth 10.

Other arrangements may be used that will achieve this same result.

The mist separator 22 is advantageously of a particular cyclonic design generally described in U.S. Pat. No. 7,311,744, although in a modified form.

It has been discovered that such a cyclonic separator 22 particularly as modified can function successfully to remove a high proportion of mist from the air flow directed therethrough over a substantial range of air flow rates through the separator 22 such that considerable variations in the rate of flow of the air being drawn through the separator 22 is possible while maintaining a high degree of demisting at the enclosure booths 10.

Referring to FIGS. 5-10, the separator 22 includes a cylindrical, tubular housing 32 that defines a cylindrical inside wall 34 (see FIGS. 5-7), and that is connected between aligned inlet and exit end couplings 36b and 36a provided with associated inlet 96 and exit 97 openings and adapted for connection to the exhaust duct system 14 such that mist contaminated air enters as indicated at 40g and pre-cleaned air exits as indicated at 40a.

Internal stationary vanes 38 are connected in the upstream and downstream end portions of the housing 32. The vanes 38 are sized and positioned to establish and maintain a cyclonic air flow pattern such as indicated at 40b downstream thereof. The cyclonic flow causes the liquid to migrate outwardly as indicated at 40c to the inside wall 34, and to flow downwardly along the surface of the inside wall 34 as indicated at 40d. To this end, a separation chamber 56 is defined between the vanes, generally in the center portion of the housing, and is characterized as being of generally open, unobstructed construction as shown for maximum separation of mist from the swirling air flowing therethrough.

In preferred embodiments, the vanes 38 are used at both the upstream and downstream ends. Between the inside wall 34, longitudinally spaced center supports 52a, 52b provide for relatively stiff cyclonic-flow vane structure.

A liquid collection chamber 42 is located at the bottom portion of the separator 22 to collect the liquid flowing along the inside wall 34, and to direct the liquid to a drain 44. The liquid collection chamber 42 also establishes a barrier to prevent the liquid from being sucked back into the air as it exits the separator 22 such that, once the liquid enters the chamber 42, it is generally trapped therein. The collection chamber 42 is an annular, dead-ended space provided with an annular entrance opening that is coincident with the inside wall 34 of the housing 32 such that liquid flowing in the upstream direction along the inside wall of the separator 22 flows directly into the collection chamber 42 as indicated at 40e.

Figure 5:
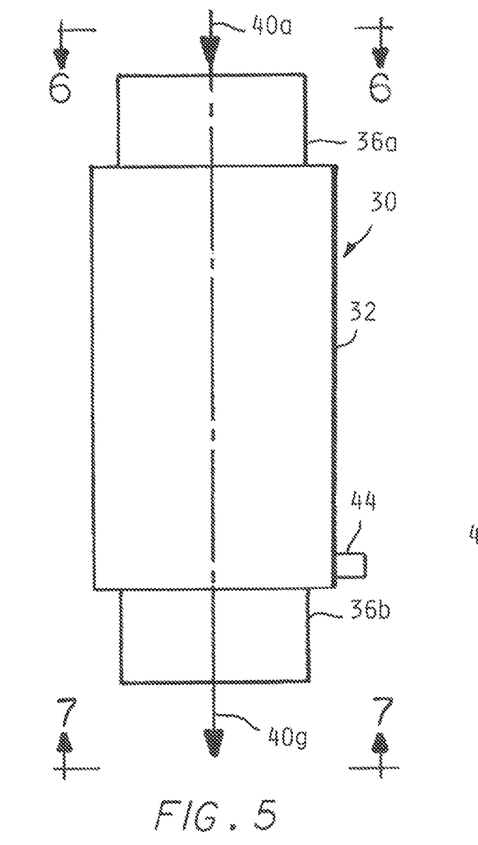
Figure 5A:
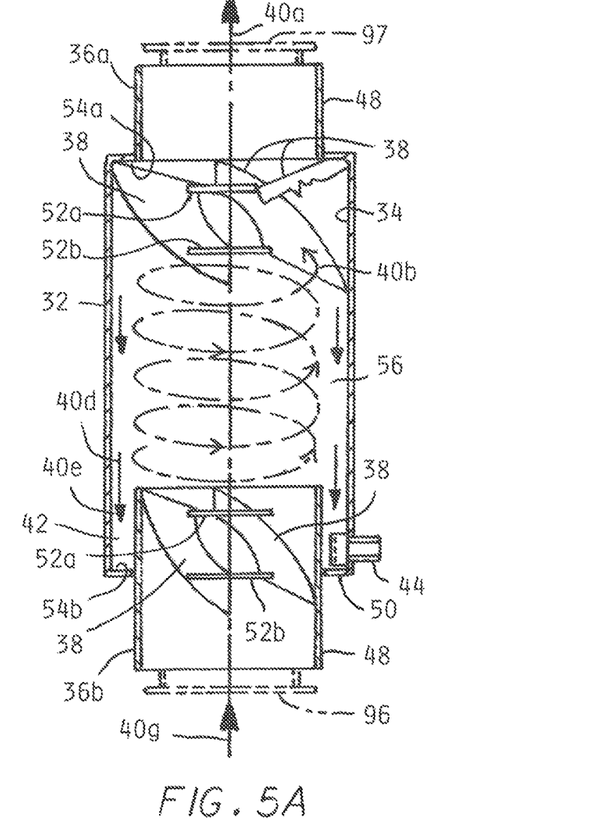

The collection chamber 42 may be defined between the outside diameter (OD) of an inlet tube 48 that extends in the downstream direction from the inlet coupling 96, the inside diameter (ID) of the housing wall 34, a downstream end wall 54b of the housing. For separators 22 as here intended to be used in a generally vertical orientation, the drain 44 is preferably positioned with its downstream open edge coincident with or slightly downstream of the radially outer edge of the end wall 54b (to the left as shown in FIG. 5) to preclude a dead-space behind the drain 44 in which liquid could accumulate.

Figure 6:
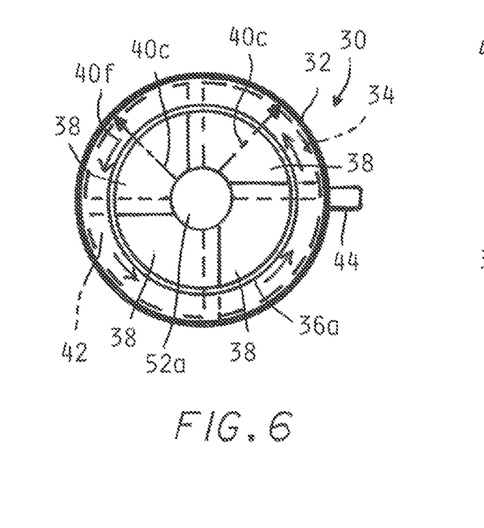
Figure 7:
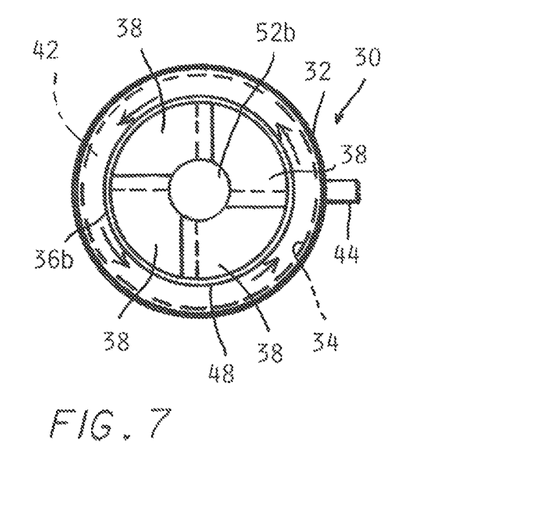
Figure 8:
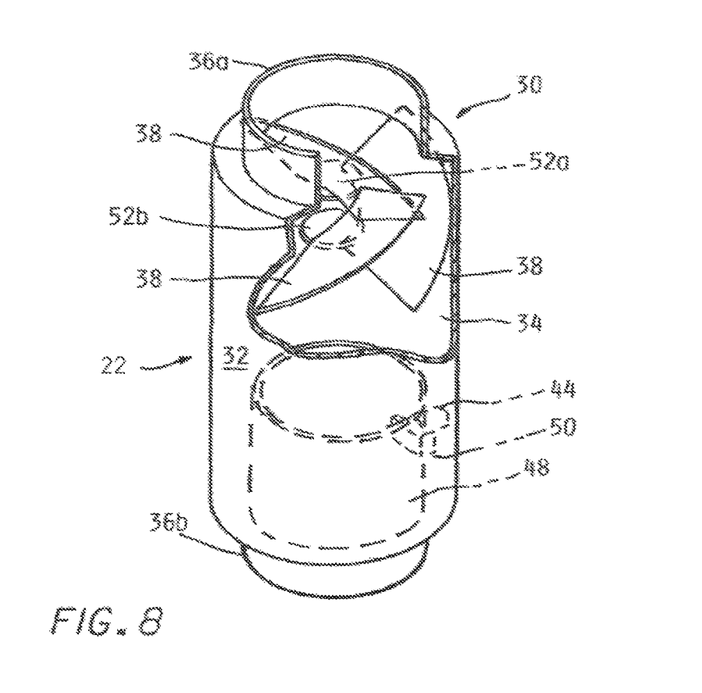

In the collection chamber 42, the liquid continues to flow in a generally circular pattern such as indicated at 40f in FIG. 6. Upon reaching the downstream end and bottom of the collection chamber 42, circulation of the liquid is interrupted by a flow-interrupter 50 that projects into the collection chamber in the downstream end portion proximate the downstream wall 54b. The flow interrupter 50 is shaped to direct the liquid flowing around the collection chamber 42 to the drain 44. The flow interrupter 50 is preferably provided in the form of a generally radially inwardly extending wall portion that breaks the swirling flow at the drain 44.

To this end, the flow interrupter 50 is connected or located just downstream of the drain 44 with respect to the swirling flow of liquid therein, and is provided in a form that includes at least a first portion that projects generally longitudinally along the wall 34. In preferred embodiments, the flow interrupter 50 is further provided with a second portion that extends generally substantially circumferentially from the first portion such as the L-shaped hood shown that extends over and above the drain 44, or in the form of a curved-hood that curves over and above the drain 44. It has been found that, in most instances encountered, the hood extending to a position over the drain 44 is preferred as providing better direction of the liquid into the drain 44 as compared with, for example, a straight interrupter consisting of only the first generally radially projecting portion.

For use in existing mist collection systems, the separator 22 is preferably adapted for relatively low air pressure drop. This allows use of the separator 22 to be used within the air-flow capacity of the blower 18 of the existing system. To this end, the separator 22 may be provided with upstream and downstream annular walls 54a, 54b that extend radially outwardly from associated inlet and exit couplings 36b, 36a proximate the inlet and exit openings, and the inside wall 34 extends therebetween to define an upstream expansion chamber into which the air flow enters upon flowing through the inlet opening and in which stationary vanes are located, the inside diameter of the wall 34 being preferably approximately one-fourth to one-third larger than the diameter of the hoses and end couplings 36a, 36b (i.e., the diameter of the inlet and exit openings) for a relatively low pressure drop embodiment.

By way of dimensional example, one of the common size hoses currently used in mist collectors are six inch hoses. In this instance, it has been found that a cylindrical wall ID of eight inches, with an end coupling of six inches diameter, provides relatively low pressure drop; and that for vanes extending longitudinally approximately four and one-half (4½) inches, with the leading edges set at an angle of approximately 25 degrees with respect to the upstream opening face (as seen in FIG. 5), and extending longitudinally therefrom at an angle of approximately 35 degrees with respect to a longitudinal axis therethrough, provides good cyclonic action in the separator 22.

It has also been found that a flow restrictor adapted to provide a radial clearance of approximately one-fourth (¼) to one-half (½) inch, and preferably three-eighths (⅜) inch allows the liquid to enter the collection chamber 42, while providing good restriction to prevent the liquid from leaving the chamber 42. In this example, as well as other similarly sized units such as for eight inch hoses provided with a ten inch ID wall and a flow restrictor cone radial clearance of approximately three-eighths inch, removal of between 85-95% of the mist from the air has been consistently achieved, with a relatively low pressure drop.

It will also be understood, however, that for new design systems where the pressure drop may be permitted to increase or decrease, because the capacity of the fan blower 16 has not yet been established (as compared to existing mist collections systems with an already installed fan blower), the dimensional difference between the end couplings and the inside diameter of the housing may be increased or decreased.

It has also been found that the optimum size and number of vanes 38 to establish the desired cyclonic action will vary depending on the size of the cylindrical wall 34. Continuing with the above dimensional examples, it has been found that three vanes 38 of suitable size provide good cyclonic action in a separator with a six inch ID, and five vanes 38 may be required in the larger ten inch housing.

Figure 4:
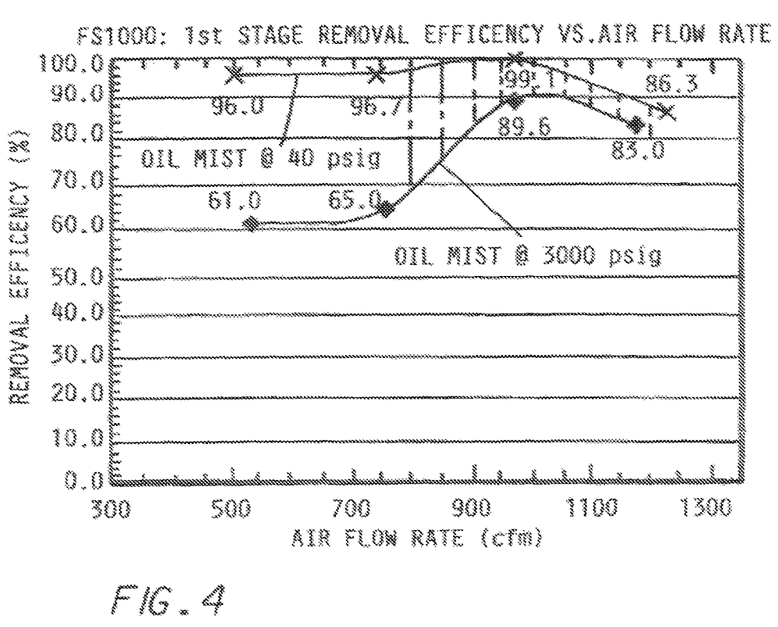

FIG. 3-4 shows the performance of the cyclonic mist separator 22 over a range of air flow levels

The invention claimed is:

1. A method for eliminating mist generated in a machine tool installation having a booth enclosing said machine tool installation and provided with one or more access door panels which are opened for loading and unloading parts therein but closed during a cycle of machining of said parts comprising:
    connecting a blower to said booth by an exhaust duct system and operating said blower with a drive motor so as to continuously draw a flow of air into said booth from any opening in said booth during machining of parts and also drawing air out of said booth and into said exhaust duct system to create a partial vacuum in said booth sufficient to prevent the escape of air containing mist from said booth as a result of spraying cutting fluid on said parts into air surrounding said booth;
    providing a remote demister apparatus including one or more filters connected to said exhaust duct system receiving said air flow drawn out of said booth and passing said air flow through said one or more filters in said remote demister apparatus and thereafter exhausting said air flow through an outlet;
    installing a cyclonic separator in said exhaust duct system at a point adjacent said machine tool installation booth, directing said air flow drawn out of said booth into and through said cyclonic separator so as to remove a substantial portion of mist contained in said air drawn out of said booth prior to entering said remote demister apparatus; and
    increasing the power to said blower drive motor so as to counteract any effects resulting from any increase in air pressure in said booth which increase in air pressure would reduce the vacuum level therein and reduce an inflow of air into said booth through openings therein which could otherwise increase the possibility of leakage of mist containing air out of said booth and into said air surrounding said booth generating an electronic signal when any of said access panel doors are about to begin to be opened, and transmitting signals to a VFD controller associated with said blower drive motor to cause a corresponding increase in blower drive motor power to in turn increase the rate of air flow drawn from said booth as long as any of said panel doors are open; wherein a sensor is included detecting a blockage in one or more of said filters and increasing the power to said blower drive motor corresponding to a degree of blockage of said one or more filters.

2. The method according to claim 1 wherein said machine tool installation includes a plurality of machine tools and wherein power to said blower drive motor is proportionately reduced whenever fewer than all of said machine tools are in operation.

3. The method according to claim 1 including mounting said cyclonic separator so that a cylindrical tube included in said cyclonic separator through which air is drawn is oriented vertically so as to cause air to be drawn through said cyclonic separator in vertical direction;
    connecting a set of stationary vanes in each of an upstream and downstream portions of said tube and sized and positioned to direct the air flowing therethrough in a vertical cyclonic path through said tube such that mist in the air therein migrates outwardly and in the downstream direction along the inside wall of the tube; and
    locating a drain near the downstream end of said collection chamber.

4. The method according to claim 1 including sensing an increase in said air flow into said booth and transmitting a corresponding signal to a VFD controller connected to cause an increase in power to said blower drive motor.

5. The method according to claim 1 including sensing a vacuum within said booth and generating a corresponding signal and transmitting the same to a VFD controller to increase or decrease the power to said blower drive motor so as to substantially maintain a predetermined vacuum level therein sufficient to substantially prevent the escape of air containing said mist out of said booth and into air surrounding said booth.

* * * * *